April 21, 1959

E. P. NEHER 2,883,132

RESILIENT MOUNTING SUPPORT

Filed Nov. 12, 1954

INVENTOR
*Eldon Paul Neher*

BY *Evans & McCoy*
ATTORNEYS

United States Patent Office 2,883,132
Patented Apr. 21, 1959

2,883,132

RESILIENT MOUNTING SUPPORT

Eldon Paul Neher, Logansport, Ind., assignor to The General Tire and Rubber Company, Akron, Ohio, a corporation of Ohio Application November 12, 1954, Serial No. 468,414

1 Claim. (Cl. 248—26)

This invention relates to a resilient mounting support suitable for isolation of vibrations of rotating machinery such as electric motors, and the like.

An object of any resilient motor mounting is to afford the maximum cushioning effect for the mounted members and at the same time afford the mounted members a maximum of stability and strength at the point where it is secured to its base.

In order to reduce transmitted vibrations the optimum amount, it is desirable to support the vibratory source, such as a motor, etc., on the softest possible spring or support. The weaker or softer the spring suspension the lower is the natural or critical frequency. In the most effective suspensions the natural or critical frequency of the system including the mounted member and the resilient mounting would be less than the normal speed of vibration of the mounted member. At times of starting and stopping, the motor or suspended member must therefore pass through the critical frequency where there is substantially no control of the movement of the mounted member. In order to prevent this the mountings are made more rigid or of harder material than desired even though the undesirable vibration transmission is much greater. The more flexible or softer motor mounts have also had a tendency for the components to separate especially if the motor is dropped or jarred strongly as when attached to equipment dropped by parachute, etc. This is particularly the case when the components of said mounts are covered with oil, grease, sludge, etc. What usually occurs is that the rubber annulus "pops out" or springs out of the mount assembly, thereby destroying the mountings. Likewise, the tendency for the components to separate has also restricted the softness of the rubber annulus to a degree somewhat less than is desirable.

An object of this invention is (1) to provide a resilient mounting with a relatively soft annulus bonded between an inner and outer rigid ring, that will permit the use of a relatively soft suspension to decrease transmitted vibrations but which has means to absorb sufficient energy at the critical frequency to limit the movement of the mounted member when its speed is at or near the critical frequency.

Another object is to provide such a mounting ring which will resist, in an exemplary manner, separation of its components even if the motor, etc. is severely jarred or dropped by parachute, etc.

Other objects will be apparent from the description of the invention as illustrated by the appended drawings in which.

Figure 1:
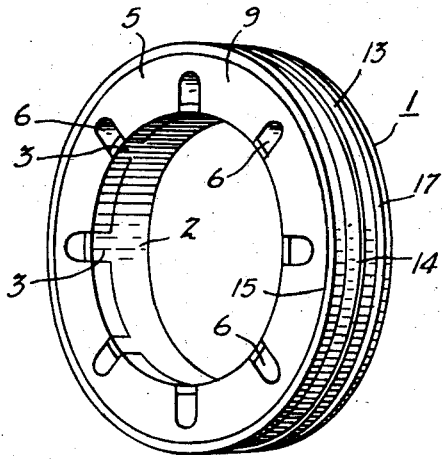
Figure 1 is a perspective view of a resilient mounting support embodying the present invention.
Figure 2:
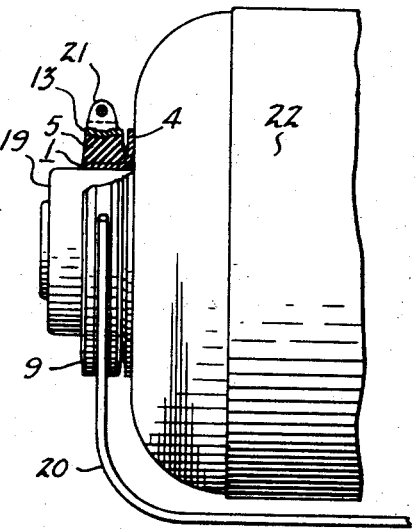
Figure 2 is an elevation view of a portion of a mounted member, supporting or base member, with a mounting support of the present invention in position, which mounting support is partly in section. This illustrates a typical application of my resilient mounting support on an electric motor with mounting base.
Figure 3:
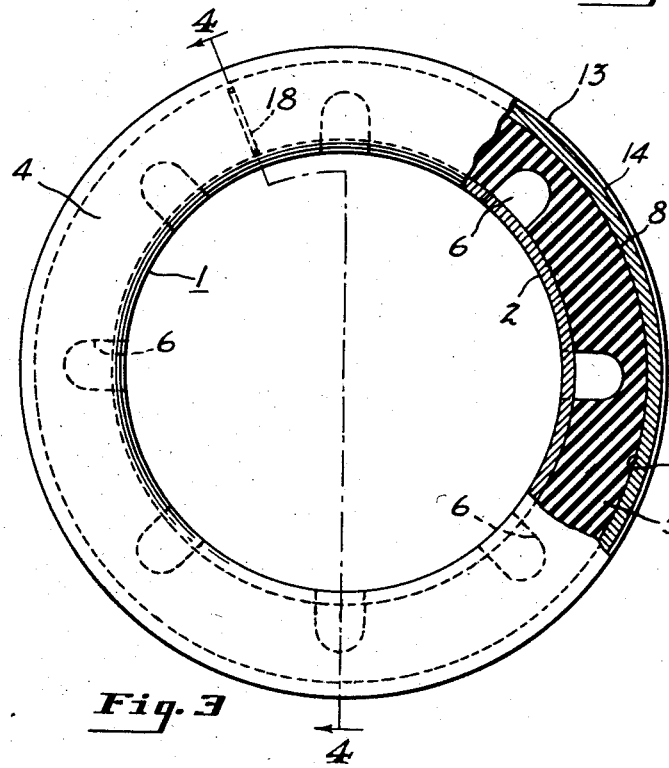
Figure 3 is an elevational view of parts broken away to illustrate the inner construction.
Figure 4:
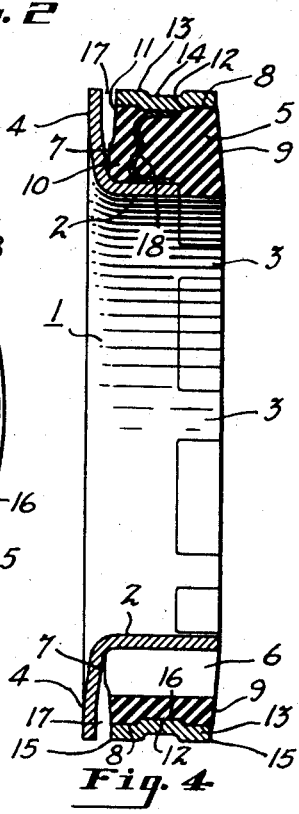
Figure 4 is a sectional view on the line 4—4 of Figure 3.

Referring particularly to the drawings in which like numbers refer to like parts throughout the several views, the resilient mounting ring comprises an L-shaped inner ring 1 of rigid material such as metal, an outer ring 13 of rigid material such as metal, and a rubber member such as the annulus 5 interposed between and bonded to the said inner and outer rings.

More specifically, the inner ring 1 has an axially extended portion 2 with an inner diameter equal to the outer diameter of the journal housing 19 of the mounted member or motor 22. An integral flange portion 4 extends generally radially outward but inclines axially away from said axially extended portion 2. The flange 4 is carried or attached to one end of said axially extended portion 2. Extending from the axially extended portion 2 and preferably in the same cylindrical surface but opposite the end carrying the flange 4 are spaced fingers 3. The rubber annulus 5 has means such as a number of transverse slots 6 for reducing its resistance to circumferential or rotary shear strain. Its inner surface is slotted on one edge so as to form the slots 6 or openings extending outwardly from the inner surface. These slots 6 may extend through the width of said rubber annulus 5. The size, number and extent of the slots can be varied to change the rigidity of the annulus 5 in accordance with torque and strength of the motor 22 or mounted member. The outer surface 8 of said rubber annulus 5 is preferably of less width than the inner surface so that the rubber annulus 5, preferably of trapezoidal cross section, has one continuously sloping end wall 9. The opposite side of said rubber annulus 5 is provided with a damping surface 10 which is adapted to co-act with said flange 4 bearing thereagainst only upon axial displacement of said inner and outer rigid members as occurs during or near the critical frequency.

The damping surface 11 is provided with a damping portion 10 or boss which is located on the side of said annulus most closely adjacent said flange 4 and adjacent the axially extended portion 2 of said inner rigid member 1. The boss or damping portion 10 protrudes beyond the remaining portion of said damping wall 11 of the said annulus 5. The outer surface 8 of the annulus 5 is preferably provided with a circumferential groove 12 approximately midway between the outer edges of said annulus 5. A clearance 7 is provided between the end face of said damping portion 10 and the adjacent flange 4 so that frictional contact is not made except at high amplitudes with consequent axial movement. The radial thickness of the damping portion 10 or the width of the frictional surface thereof is preferably about ⅓ to ⅔ of the radial thickness of said annulus 5. A larger clearance 17 is preferably provided between the outer part of said flange 4 and the outer portion of the damping wall 11 of the annulus 5.

The outer rigid member 13 preferably has a circumferential groove 14 pressed or rolled in its outer surface about midway between the outer edges 15 so as to form a ridge 16 in its inner surface opposite the groove 14. The ridge 16 is made so as to be continuous to the groove 12 of the annulus 5 and the groove 14 in the outer rigid member 13 is adapted to engage the cradle or mounting base 20 and its clamps 21.

The inner ring 1 engages the rubber annulus 5 and is bonded or securely in contact therewith. The fingers 3 engage in or underlie the slots 6 to provide a continually inner cylindrical surface. The fingers serve both as locating abutments for the assembly of the inner ring 1 and the rubber abutments as well as means whereby said members are more securely engaged and the flange 4 is closely adjacent to the damping surface or boss 10.

When the inner ring 1 and the rubber annulus 5 are so engaged a portion of flange 4 is almost in contact with the damping portion 10. An annular space 17 is provided between the sloping wall 11 of the rubber annulus 5 and the outer portion of the flange 4. The flange 4 is so constructed that its outside diameter extends slightly beyond the outside diameter of the rubber annulus 5 though this dimension may vary more or less.

The inner surface of the outer ring 13 engages the outer surface 8 of the rubber annulus 5 with the ridge 16 engaging the groove 12 of the rubber annulus 5. A pigtail 18 made of a material with suitable conductivity connects the inner ring 1 and the outer ring 13 and serves as a ground wire for the mounted members 22.

The axially extended portion 2 and the fingers 3 of the inner ring 1 are pressed onto the journal boss 19 of the mounted member 22, thereby securely engaging the resilient mounting to the mounted member 22. The groove 14 of the outer ring 13 is so constructed as to be adaptable to snugly engage a cradle 20 or a V-shaped mounting base and its clamps 21 which securely fasten the outer ring 13 of the resilient mounting to the cradle 21 or V-shaped base. When so assembled it is seen that the inner ring 1 is securely engaged to the journal boss 19 of the motor 22 and likewise the outer ring 13 is securely fastened to the cradle 20 of the mounting base. When the motor 22 is running at normal speeds, the rubber annulus effectively absorbs the mass of vibrations, giving quieter performance, longer life to the motor, etc. However, the superior vibration-absorbing qualities of my resilient motor mount are most vividly exemplified during periods of starting and stopping of said motor when the natural or critical frequencies are reached and the initial thrust of said motor is at a maximum. It is at this point that the motor tends to have some axial movement as well as torsional rotation. When this occurs, there is sliding friction applied to the flange 4 where it is firmly in contact with the damping portion 10 of the rubber annulus 5. This serves to further cushion the vibrations to an extent above and beyond which an ordinary resilient mounting will do.

A motor 22 equipped with two of my resilient mountings is also almost impossible of being separated therefrom, nor can the components of my mount separate. In this case the flange 4 serves to prevent any extensive axial shifting of said motor or components of the mount. This cheaply and efficiently overcomes a common fault of an ordinary resilient mounting, (i.e. separation of its components) and provides a sturdier more reliable resilient mounting.

The term "trapezoidal" is used in this application in its normal sense to describe a figure having opposing sides of unequal length and, therefore, excludes square or rectangular figures.

What I claim as my invention is:

In an electric motor support, a motor housing, a motor shaft, a resilient mounting for supporting said shaft coaxial with a portion of said housing, said mounting comprising a rigid support, an outer rigid ring member rigidly mounted on said support and having a generally cylindrical inner surface substantially concentric to said shaft, a rigid inner ring having a substantially cylindrical portion rigidly mounted on said housing portion concentric to said shaft and having a circumferential flange portion extending radially outwardly from said cylindrical portion, damping means comprising an elastic rubber annulus secured to the internal surface of the outer ring member and the external surface of the inner ring, said annulus forming the sole means for supporting the inner ring from the outer ring member and providing means for yieldably resisting axial and torsional vibrations of the inner ring due to vibration of said motor, said annulus having an axially projecting portion with a circumferential face providing means for frictionally engaging said flange during turning movements of said inner rigid ring relative to said outer rigid ring to increase the damping effect of said rubber annulus, said face having a radial width that is about one-third to two-thirds the radial thickness of said annulus and being inclined relative to said flange when the annulus is in its normal unstressed condition so that the face is substantially out of contact with the flange when the axial vibrations have a normal magnitude and has substantial contact with the flange when the axial vibrations are abnormally large in magnitude to damp torsional vibrations.

References Cited in the file of this patent

UNITED STATES PATENTS

| | | |
|---|---|---|
| 1,678,438 | Leland | July 24, 1928 |
| 1,834,450 | Flintermann | Dec. 1, 1931 |
| 2,004,532 | Mapes | June 11, 1935 |
| 2,074,136 | Welch | Mar. 16, 1937 |
| 2,349,215 | Wahlborg | May 16, 1944 |
| 2,750,137 | Cunningham | June 12, 1956 |

FOREIGN PATENTS

| | | |
|---|---|---|
| 210,639 | Switzerland | Oct. 1, 1940 |
| 659,562 | Great Britain | Oct. 24, 1951 |